Figure 1:
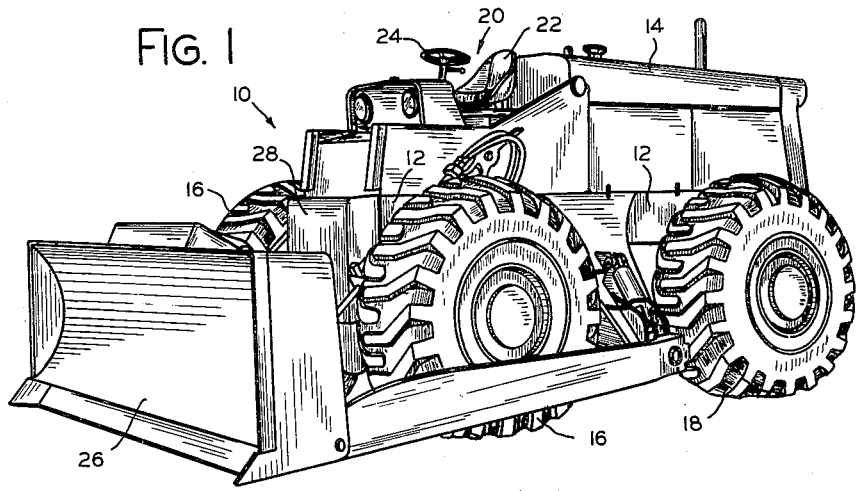

Feb. 27, 1962 P. F. McADAMS ET AL 3,023,024
REMOVABLE WEIGHT FOR VEHICLE
Filed May 25, 1959 4 Sheets-Sheet 1

INVENTORS.
PAUL F. McADAMS
BRUCE V. CHRISTENSEN
BY
Kenneth C. Witt
ATTORNEY

Feb. 27, 1962 P. F. McADAMS ETAL 3,023,024
REMOVABLE WEIGHT FOR VEHICLE
Filed May 25, 1959 4 Sheets-Sheet 2

INVENTORS.
PAUL F. McADAMS
BRUCE V. CHRISTENSEN
BY
Kenneth C. Witt
ATTORNEY

INVENTORS.
PAUL F. MCADAMS
BRUCE V. CHRISTENSEN
BY
Kenneth C. Witt
ATTORNEY

Feb. 27, 1962 P. F. McADAMS ETAL 3,023,024
REMOVABLE WEIGHT FOR VEHICLE
Filed May 25, 1959 4 Sheets-Sheet 4

INVENTORS.
PAUL F. McADAMS
BRUCE V. CHRISTENSEN
BY
Kenneth C. Witt
ATTORNEY

United States Patent Office 3,023,024
Patented Feb. 27, 1962

3,023,024
REMOVABLE WEIGHT FOR VEHICLE
Paul F. McAdams, St. Joseph, and Bruce V. Christensen, Berrien Springs, Mich., assignors to Clark Equipment Company, a corporation of Michigan
Filed May 25, 1959, Ser. No. 815,601
8 Claims. (Cl. 280—150)

This invention relates to removable weight constructions for vehicles whereby a weight may be readily removed for transport or other purposes. Many types of vehicles require the addition of dead weight to increase the traction of the vehicle or to counter-balance a load being handled by the vehicle, or for other purposes. For example, a tractor vehicle may require the addition of weight to increase the traction of the wheels and thereby increase the pushing or pulling ability of the tractor, while vehicles such as fork trucks and other material handling machines and tractor shovels, excavator cranes and other construction machinery utilize counterweights in order to increase the lifting and/or carrying capacity of the vehicle.

It is frequently desirable to make such weights and counterweights removable in order to lighten the weight of the vehicle for transport over the highway or for transport by air. It will be appreciated that there are weight restrictions applicable on most highways and very rigid weight limitations applicable to air transport; and such restrictions and limitations often make it necessary to transport the weight or counterweight separately from the vehicle in order to minimize the weight of the heaviest piece.

The primary object of the present invention is to provide a simple and inexpensive removable weight construction for a vehicle, which permits the weight to be readily assembled or disassembled from the vehicle, and which has provision for positively securing the weight to the vehicle when desired.

In carrying out our invention in one form, we provide a flat weight support secured to the main frame of the vehicle and projecting horizontally, and provided with a pair of openings in the upper surface of the support. The removable weight has a horizontally disposed slot in one side thereof of greater depth than the thickness of the support, the weight being adapted to rest on the support with the support projecting into the slot. A pair of downward projections from the upper surface of the slot project into the said openings, and a securing device is provided for connecting the weight to the support.

Figure 2:
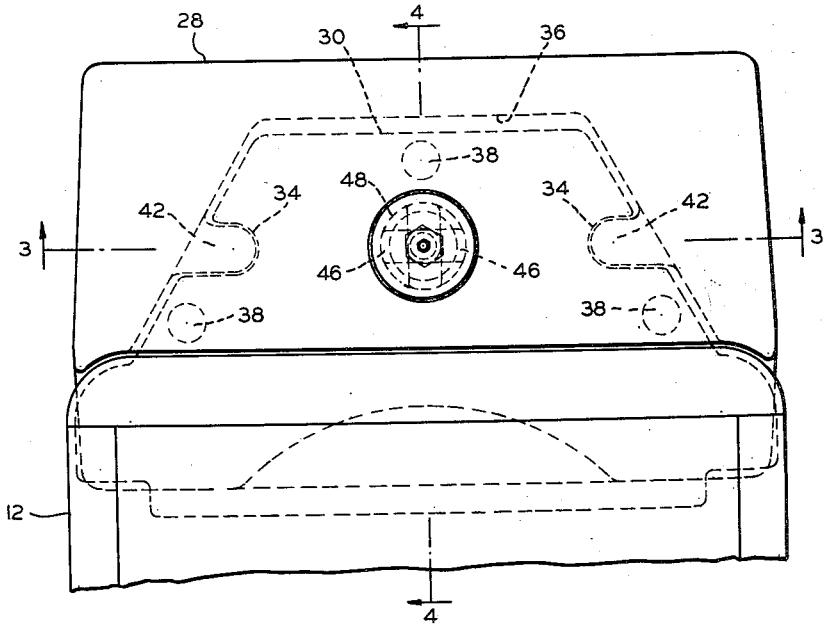
Figure 3:
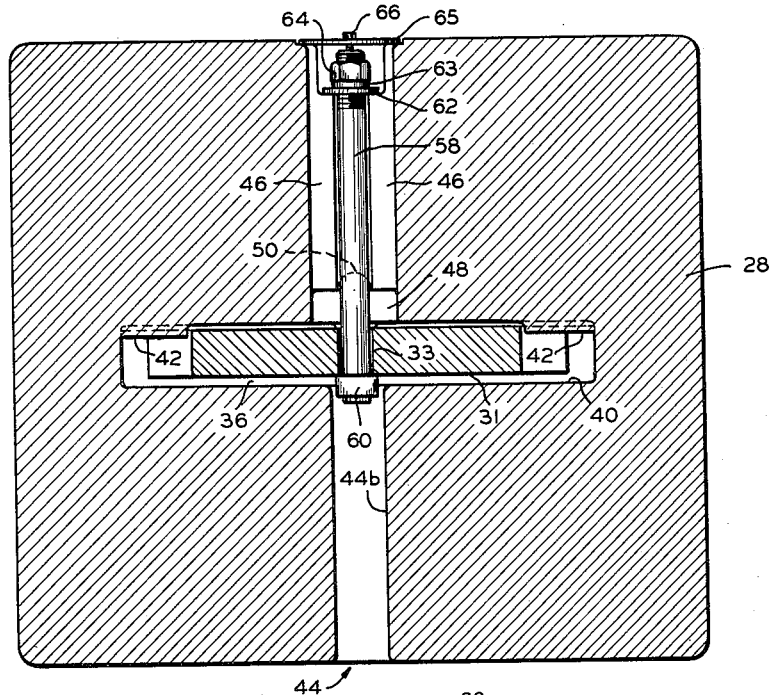
Figure 4:
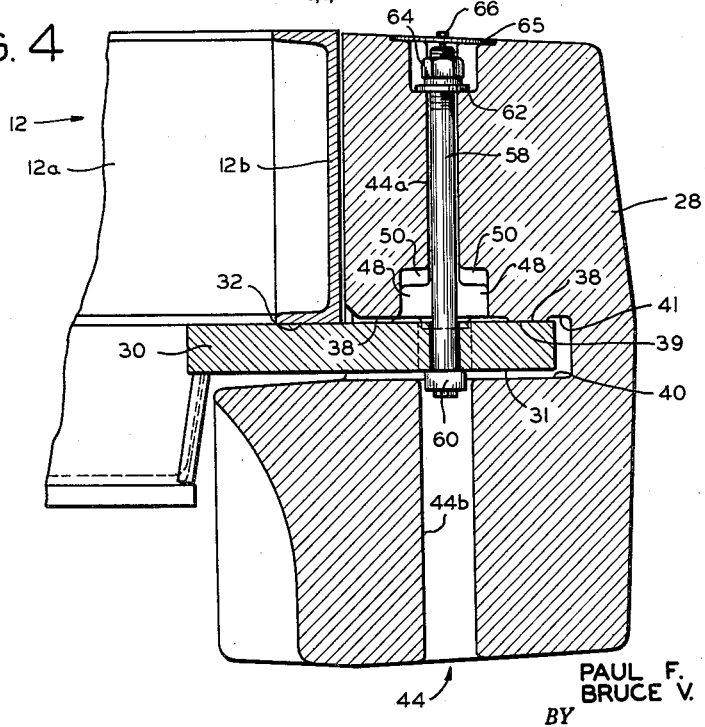
Figure 5:
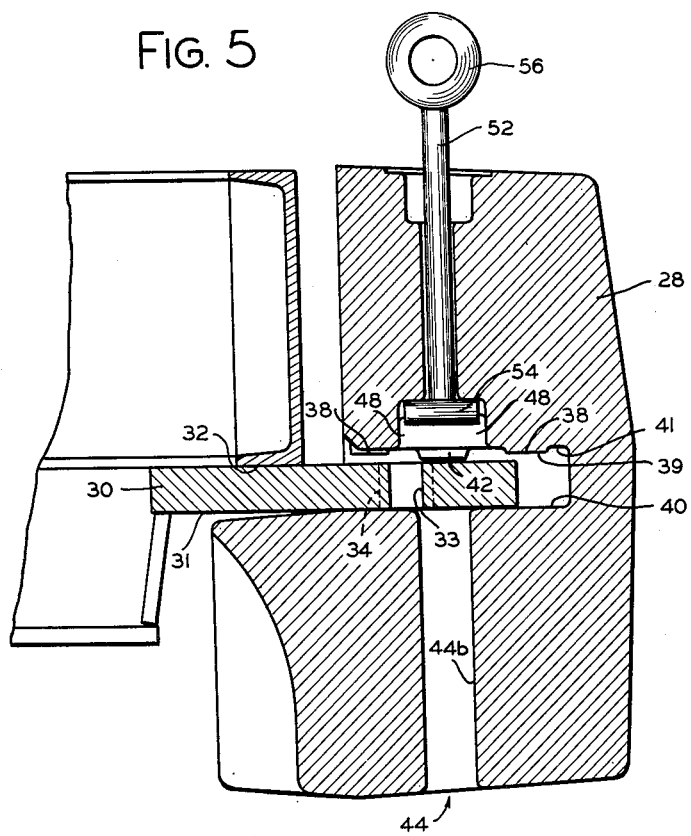
Figure 6:
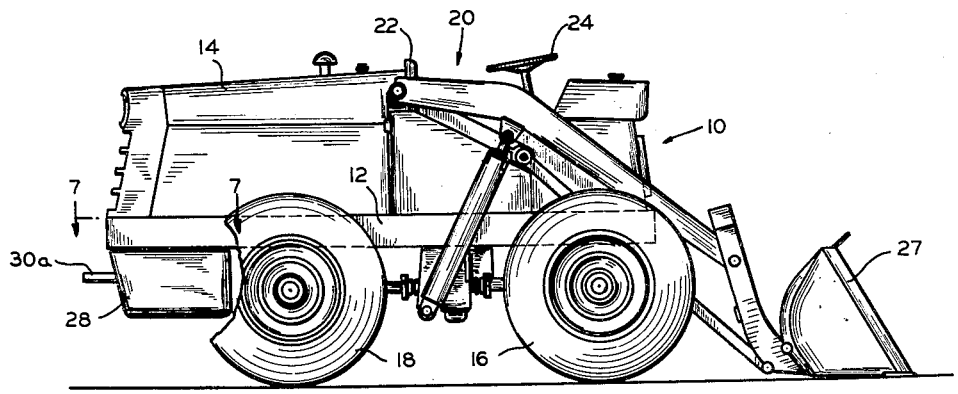
Figure 7:
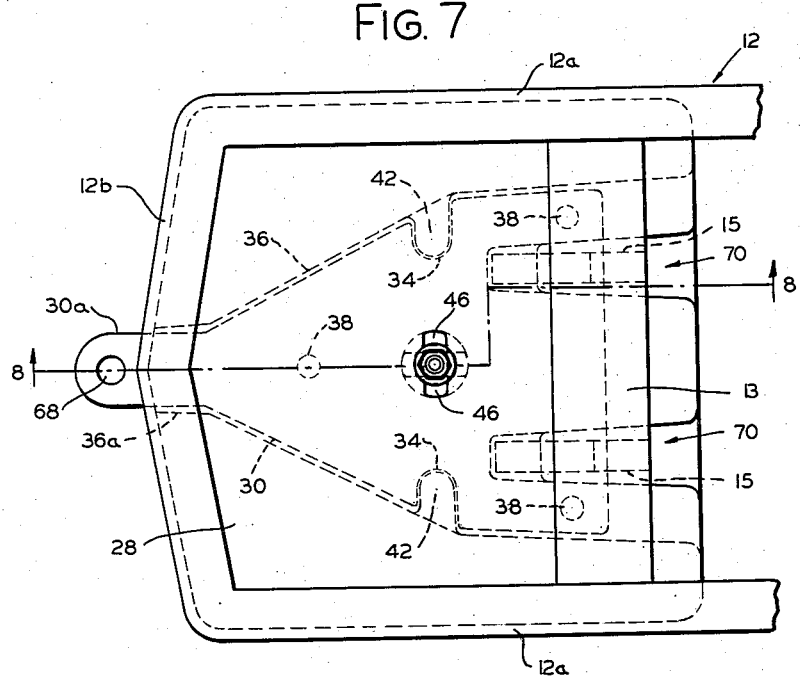
Figure 8:
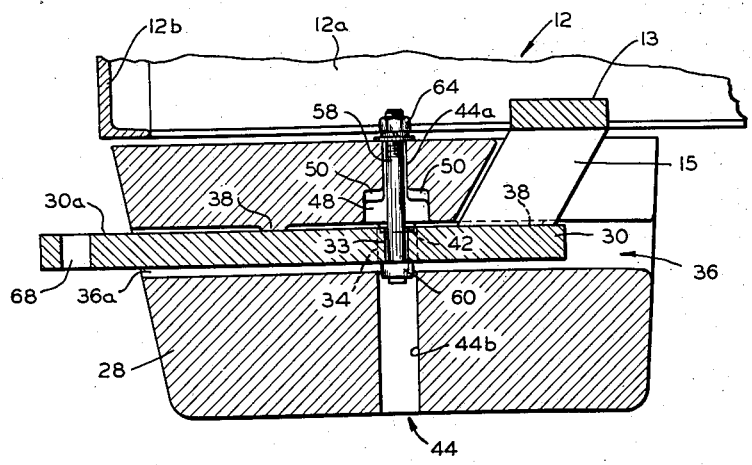

For a clearer and more complete understanding of our invention, reference should be had to the accompanying drawing in which:

FIG. 1 is a perspective view of a rubber-tired four-wheel bulldozer vehicle embodying a preferred form of our invention, FIG. 2 is a partial top plan view of the vehicle of FIG. 1 showing the removable weight (this view is taken facing forward on the vehicle, looking downward, with non-essential parts of the vehicle omitted for the sake of simplicity and clarity), FIG. 3 is a sectional view along the line 3—3 of FIG. 2, FIG. 4 is a sectional view along the line 4—4 of FIG. 2, FIG. 5 is a view similar to FIG. 4 but showing a lifting device in position for lifting the weight and the weight partially removed, FIG. 6 is a view of a tractor shovel machine embodying a modified form of the invention in connection with a counterweight, FIG. 7 is view along the line 7—7 of FIG. 6, and FIG. 8 is view along the line 8—8 of FIG. 7.

Referring to FIG. 1 of the drawing, the numeral 10 indicates generally a four-wheel rubber-tired bulldozer machine. The vehicle 10 includes a main frame portion 12 having a body portion 14 thereon. Vehicle 10 also includes a pair of front wheels 16 and a pair of rear wheels 18 (only one of which is visible in FIG. 1). The vehicle 10 illustrated is propelled by prime mover (not shown) housed within the body portion 14, which is arranged to drive both front wheels 16 and rear wheels 18. Rear wheels 18 are the dirigible wheels which may be turned for steering the vehicle. The vehicle 10 has an operator's station indicated generally at 20, including a seat 22 and an operator's steering wheel 24 which is connected to dirigible wheels 18 for steering the vehicle during operation. Also located at the operator's station are the necessary pedals, levers, and other control devices for operating the vehicle 10 in forward and reverse and for operating the bulldozer blade 26 which projects at the front of the vehicle.

It will be readily appreciated by those familiar with bulldozer machines that the vehicle 10 may be used for moving earth and other material by digging and/or pushing it with the blade 26, and for other pushing operation as well. The blade 26, under the control of the vehicle operator, may be tilted forwardly and rearwardly about a transverse axis and also tilted laterally about a longitudinal axis.

The vehicle 10 is provided with a weight 28 on the front to increase the total weight of the machine and thereby increase the traction or pushing ability of the machine. As shown, the weight 28 also serves as a brush guard, that is, if brush or other objects are forced upwardly by the action of the blade, the weight 28 prevents their engaging the underside of the vehicle and damaging parts thereof. The weight 28 is readily removable because of the construction illustrated in FIGS. 2, 3 and 4 of the drawing.

As best seen in FIG. 4 of the drawing, a flat weight support member 30 is secured, preferably by welding along their contiguous surfaces 32, to the bottom of main frame portion 12. As illustrated, frame 12 includes longitudinal channel portions 12a (one which appears in FIG. 4) and a transverse channel portion 12b. As shown in FIG. 2 the weight support 30 is generally trapezoidal in shape in plan view, and is provided with a pair of openings 34 extending toward the center from the tapered sides thereof. As illustrated, these openings extend entirely through the support member 30 from top to bottom, although as will appear from the following description, it would be possible to have these openings in the upper surface extending only a portion of the way to the bottom, if desired. It is generally less expensive, however, to extend the openings 34 entirely through the support 30, which may be formed of a flat steel plate, for in such a case it is possible to form the openings 34 by flame cutting.

The weight 28 is provided with a horizontally disposed slot 36 projecting inwardly from the rear surface toward the front, which is slightly greater in depth than the thickness of weight support 30. This slot is also trapezoidal in plan view, as shown in FIG. 2, and of somewhat greater dimensions longitudinally and laterally than support 30. In a typical case, the depth of slot 36 may be 3¾ inches when the thickness of the support is 3 inches. The 3¾ inch dimension is between the bottom surface 40 of the slot 36 and the bottom surface 39 of three small downwardly projecting buttons or feet 38 upon which the weight is supported on support 30. These buttons project downwardly from the upper surface 41 of the slot 36. In the typical case mentioned, the weight 28 weighs approximately 8,300 lbs. and preferably is made of cast iron. By casting the three buttons or feet 38 in the weight initially, it is possible to avoid any subsequent machining operations on the weight. The three buttons 38 provide for 3-point support on the supporting member 30 so that there is no tendency for the weight to rock or tilt because of the lack of a level supporting surface.

Also projecting downwardly from the upper surface 41 of the slot 36 are a pair of inwardly disposed projections 42 which extend in this typical case approximately ⅜ of an inch below the upper surface of the support 30. These projections 42 are also cast into the weight initially and are designed to have a close but not tight fit with openings 34. The allowance of approximately ⅛ inch clearance in the design between projections 42 and openings 34 in the typical construction being described was found to allow sufficient tolerance for the casting of the weight, to produce a construction in which the weight 28 fits snugly on the support 30 but at the same time is readily assembled and disassembled from the support.

The assembly of the weight is illustrated in FIGS. 3 and 4 of the drawing. The weight 28 is provided with a vertically extending opening 44. As seen in FIGS. 3, 4 and 5, this opening is divided into two principal parts, one portion 44a above the support 30 and the other portion 44b below support 30. Above the support 30 the opening 44 is circular but is provided with lateral extensions 46 as illustrated in FIGS. 2 and 3. Near the bottom of upper opening 44a is an enlarged diameter portion 48 which communicates with extensions 46. On the top surface of portion 48, a pair of longitudinally extending curved seat portions 50 are formed, for engagement by a lifting device.

FIG. 5 shows a lifting device or bar 52 in position for lifting the weight 28. Bar 52 has transverse portion 54 at the bottom end which projects on both sides of bar 52. These projections are inserted through the portions 46 of opening 44a and then the bar 52 is turned at right angles so that the projections formed by portion 54 engage in the seats 50. This enables a crane or other suitable lifting device to lift the weight 28 by lifting on the ring portion 56 at the top of bar 52.

In assembling or disassembling the weight 28 from the support 30, the weight 28 is lifted sufficiently that the bottom surface 40 of the horizontal slot in the weight is close to engagement with the bottom surface 31 of the support 30 as seen in FIG. 5 where the weight is partially removed. In this typical case the surface 40 must be within ⅜ inch of surface 31, and this permits the projections 42 on the upper surface of the slot to be disengaged from openings 34, whereby the weight can be readily moved horizontally for assembly or disassembly.

In view of the great weight involved little is required other than the engagement of projections 42 in openings 34 in order to hold the weight on the vehicle. However, in order to make certain that jouncing or tilting of the vehicle does not dislodge the weight, a bolt 58 as illustrated in FIGS. 3 and 4 may be utilized to secure the weight to the support. This bolt extends through an opening 33 in support 30 and upwardly through opening 44a. As shown, this bolt may be inserted through the lower portion 44b of opening 44, which may be square in cross-section, and the head 60 at the lower end of the bolt may be square or other suitable configuration so that it is not necessary to hold the lower end of the bolt with a wrench during the addition of a washer 62, lock washer 63 and nut 64 at the top of the bolt to clamp the weight 28 securely against the support 30. To cover the opening 44 a plate 65 may be provided which is located in a suitable recess in the weight 28 and secured by means of a cap screw 66 which screws into the end of bolt 58.

FIGS. 6, 7 and 8 of the drawing illustrate the present invention in another form as applied to a tractor shovel. The same identifying numerals have been used for the most part as in identifying the corresponding parts of the vehicle illustrated in FIG. 6 as in FIG. 1. However, this vehicle has a bucket 27 at the front end which is used for digging, transporting and loading earth, bulk materials and the like, and this bucket is indicated by numeral 27 in FIG. 6 instead of 26 as for the bulldozer blade in FIG. 1.

Inasmuch as the tractor shovel shown in FIG. 6 is intended to lift heavy loads by means of the bucket 27, it is desirable that it be provided with a counterweight at the opposite end to increase the lifting capacity of the machine. In the tractor shovel of FIG. 6 this weight, which serves as a counterweight, is beneath the frame at the rear of the machine instead of at the front of the frame as in the case of the bulldozer of FIG. 1. However, the identifying numeral 28 is used for the weight in FIG. 6 the same as in FIG. 1.

FIGS. 7 and 8 show the internal details of the counterweight construction of FIG. 6, and here again most parts are the same as the first described embodiment of the invention and the same identifying numerals are used. There are a few differences and these are pointed out hereinafter.

In this second embodiment of the invention, instead of securing the support plate 30 directly to the underside of the frame 12, a transverse frame member 13 and a pair of depending bracket members 15 are utilized for this connection. Member 13 is secured between the two side frame members 12a, the two depending bracket members 15 are secured to the bottom of the cross brace member 13 and to the top surface of support 30, preferably by welding. The weight 28 is provided with a horizontally disposed slot 36 by which the weight is mounted on support 30 in the same manner as in the first embodiment. In this second embodiment the weight is assembled on the support from the rear, and the weight is provided with a pair of cored openings 70 which permit the weight to fit around the brackets 15.

The shape of the support 30 and the opening or slot 36, as may be seen in FIG. 7, is pointed as compared to the trapezoidal configuration of FIG. 2. Also, another feature is provided which was not present in the first embodiment. It will be observed that an extension 36a of slot 36 is provided, through the wall of the weight opposite the entrance to slot 36 an extension or projection 30a of support 30 extends through portion 36a of slot 36, and projection 30a is provided with an opening 68 so that this projection may serve as a hitch to enable the vehicle of FIG. 5 to tow trailers or other machines or vehicles.

The weight 28 is secured on the support 30 in approximately the same manner in this second embodiment as in the first one. It will be appreciated, however, that inasmuch as the opening 44 extends up into the confines of the vehicle when the weight is assembled, it is not possible to remove the weight from the vehicle 10 in exactly the same manner. In this case the bolt 60 which is shown best in FIG. 8 is first removed by removing nut 64 and allowing the bolt to drop out the bottom of opening 44. Then, the weight 28 is removed from the machine by means of jacks or a support or other equivalent means which supports the weight while the vehicle 10 is driven forwardly. Thereafter the weight 28 of FIGS. 6–8 may be handled in the same manner as is illustrated in FIG. 5 for the first embodiment.

While certain preferred embodiments of the invention

We claim:

1. A removable weight construction for a vehicle having a main frame portion, comprising a flat weight support secured to the main frame and projecting horizontally, the said support having a pair of openings in the upper surface thereof, a weight having a horizontally disposed slot therein of greater depth than the thickness of said support, a plurality of short foot members projecting downwardly from the upper surface of the said slot, the said weight being adapted to rest on the said support with the support projecting into the said slot and the said foot members in contact with the upper surface of the support, a pair of downward projections from the said upper surface of the said slot extending downwardly farther than said foot members and adapted to project into the said openings in the support, and means for securing the said weight to the said support.

2. The combination of a vehicle having a flat horizontally disposed weight support provided with at least one opening in the upper surface thereof, a weight having a slot therein greater in thickness than the said support and adapted to be positioned on the vehicle with the support extending into the said slot, a plurality of short foot members projecting downwardly from the upper surface of the said slot and adapted to contact the upper surface of the said support, a downward projection from the said upper surface of the said slot extending downwardly farther than the said foot members and adapted to project into the said opening in the support, and means for securing the said weight to the said support.

3. A removable weight construction for a vehicle having a main frame portion, comprising a flat weight support secured to the main frame and projecting horizontally, the said support having a pair of openings in the upper surface thereof, a weight having a horizontally disposed slot therein of greater depth than the thickness of said support, the said weight being adapted to rest on the said support with the support projecting into the said slot, three feet projecting downwardly from the upper surface of the said horizontally disposed slot and resting on the upper surface of the said flat weight support, a pair of downward projections from the said upper surface of the said slot longer than the said feet adapted to project into the said openings in the support, and combined means for securing the said weight to the said support and for lifting the said weight.

4. A removable weight construction as specified in claim 3 in which the combined means includes a vertical opening through the said weight for admitting bolt means for securing the weight to the said support and for admitting a lifting device.

5. A removable weight construction for a vehicle having a main frame portion, comprising a flat weight support secured to the main frame and projecting horizontally, the said support being a certain configuration in plan view having tapered side surfaces, the said support having a pair of openings therethrough extending from the tapered side surfaces thereof toward the center, a weight having a horizontally disposed slot therein of greater depth than the thickness of the said support, the said slot being approximately the same said configuration in plan view also but of greater dimensions than the support whereby the slot embraces the said support when the weight is assembled on the support, the said weight having a plurality of downwardly projecting feet from the upper surface of the said slot for engaging the upper surface of said support when the weight is assembled on the support, a pair of downward projections from the said upper surface of the said slot projecting downwardly below the said feet and adapted to project into the said openings in the support, the said weight having a vertical opening therethrough, the support having a vertical opening therethrough in alignment with the said vertical opening in the weight, bolt means adapted to pass through the said last mentioned openings and secure the said weight to the said support, and the said vertical opening in the said weight having provision for admitting a lifting device for lifting the weight and removing it from the support.

6. A removable weight construction for a vehicle having a main frame portion, comprising a flat weight support secured to the main frame and projecting horizontally, the said support having a pair of openings in the upper surface thereof, a weight having a horizontally disposed slot therein of greater depth than the thickness of said support, the said weight being adapted to rest on the said support with the support projecting into the said slot, a pair of downward projections from the upper surface of the said slot adapted to project into the said openings in the support, means for securing the said weight to the said support, and hitch means on the said support.

7. A removable weight construction for a vehicle having a main frame portion, comprising a transverse brace member secured to and forming a portion of the main frame, a pair of depending bracket members projecting downwardly from the said transverse member, a flat weight support secured to the said bracket members and projecting horizontally, the said support being a certain configuration in plan view having tapered side surfaces, the said support having a pair of openings therethrough extending from the tapered side surfaces thereof toward the center, a weight having a horizontally disposed slot extending partially through the weight and having a greater depth than the thickness of the said support, the said slot being approximately the same said configuration in plan view but of greater dimensions than the support whereby the slot embraces the support when the weight is assembled thereon, the said weight having a plurality of downwardly projecting feet from the upper surface of the said slot for engaging the upper surface of said support when the weight is assembled on the support, a pair of downward projections from the said upper surface of the slot projecting downwardly below the said feet and adapted to project into the said openings in the said support, the said weight having a vertical opening therethrough, the said support having a vertical opening therethrough in alignment with the said vertical opening in the weight, bolt means adapted to pass through the said last mentioned openings and secure the said weight to the said support, the said slot in the weight having an extension through the wall of the weight opposite the slot entrance, and a projection on the said support plate extending through the said slot extension and having means thereon for a hitch connection.

8. A removable weight construction for a vehicle having a main frame portion, comprising a flat weight support secured to the main frame and projecting horizontally, the said support beingn a certain configuration in plan view having tapered side surfaces, the said support having a pair of openings therethrough extending from the tapered side surfaces thereof toward the center, a weight having a horizontally disposed slot therein of greater depth than the thickness of the said support and which extends only partially through said weight, the said slot being approximately the same said configuration in plan view also but of greater dimensions than the support whereby the slot embraces the said support when the weight is assembled on the support, the said weight having a plurality of downwardly projecting feet from the upper surface of the said slot for engaging the upper surface of said support when the weight is assembled on the support, a pair of downward projections from the said upper surface of the said slot projecting downwardly below the said feet and adapted to project into the said openings in the support, the said weight having a vertical opening therethrough, the support having a vertical opening therethrough in alignment with the said vertical opening in the weight, bolt means adapted to pass through the said last mentioned openings and secure the said weight to the said support, and the said vertical opening in the said weight having provision for admitting a lifting device for lifting the weight and removing it from the support.

References Cited in the file of this patent

UNITED STATES PATENTS

| | | |
|---|---|---|
| 1,173,616 | Stone | Feb. 29, 1916 |
| 2,325,089 | Zeilman | July 27, 1943 |
| 2,381,729 | Dunham et al. | Aug. 7, 1945 |
| 2,798,738 | Darby | July 9, 1957 |